United States Patent
Rothman et al.

(10) Patent No.: US 7,461,299 B2
(45) Date of Patent: Dec. 2, 2008

(54) MONITORING WRITES TO CACHE AS PART OF SYSTEM ERROR HANDLING

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 439 days.

(21) Appl. No.: 11/371,613

(22) Filed: Mar. 8, 2006

(65) Prior Publication Data

US 2007/0214380 A1 Sep. 13, 2007

(51) Int. Cl.
*G06F 11/00* (2006.01)
(52) U.S. Cl. ...................................................... 714/42
(58) Field of Classification Search .................. 714/42, 714/15, 18, 20, 25, 37–39, 47
See application file for complete search history.

(56) References Cited

U.S. PATENT DOCUMENTS

| | | | | |
|---|---|---|---|---|
| 6,622,206 B1 * | 9/2003 | Kanamaru et al. | .......... | 711/113 |
| 6,681,292 B2 * | 1/2004 | Creta et al. | .................. | 711/119 |
| 6,907,512 B2 * | 6/2005 | Hill et al. | ..................... | 711/207 |
| 7,290,115 B2 * | 10/2007 | Hill et al. | ..................... | 711/207 |

OTHER PUBLICATIONS

Vmware, Inc., "Virtualization Overview", *White Paper*, 2005, pp. 1-10.

* cited by examiner

*Primary Examiner*—Nadeem Iqbal
(74) *Attorney, Agent, or Firm*—Konrad Raynes & Victor LLP; David W. Victor (57) ABSTRACT

Provided are a method, system and program for buffering writes to an Input/Output (I/O) device in a cache. Writes to an Input/Output (I/O) device are buffered in a cache. Information on the buffered writes are communicated to a monitor component enabling identification of the buffered writes in the cache. A system failure is detected. The monitor component determines from the information on the buffered writes buffered in the cache that have not been transferred to the I/O device in response to the system failure. The monitor component causes the transfer of the determined writes to the I/O device.

28 Claims, 6 Drawing Sheets

Cached Write Information

FIG. 5

Committed Write Information

MONITORING WRITES TO CACHE AS PART OF SYSTEM ERROR HANDLING

BACKGROUND

In the event of a critical error in a computer system, the operating system may initiate or require a restart. In such case, write data buffered in a cache memory may not be written or committed to a target disk if the system initiates a restart or freezes to require a restart before the write data is flushed from the cache. This loss of uncommitted data in the cache is a common cause of data corruption, especially if the lost uncommitted data comprises operating system configurations settings. Data corruption may also occur if data has only been partially written from the cache to the disk.

Certain recovery solutions use disk journaling to recover to a previous system state. This recovered system state may be at a point-in-time before the lost write data was written to cache, thereby avoiding any errors or corruption from the lost data. Disk journaling involves buffering writes to allow recovery as of the time of the last buffered write:

DETAILED DESCRIPTION

Figure 1:
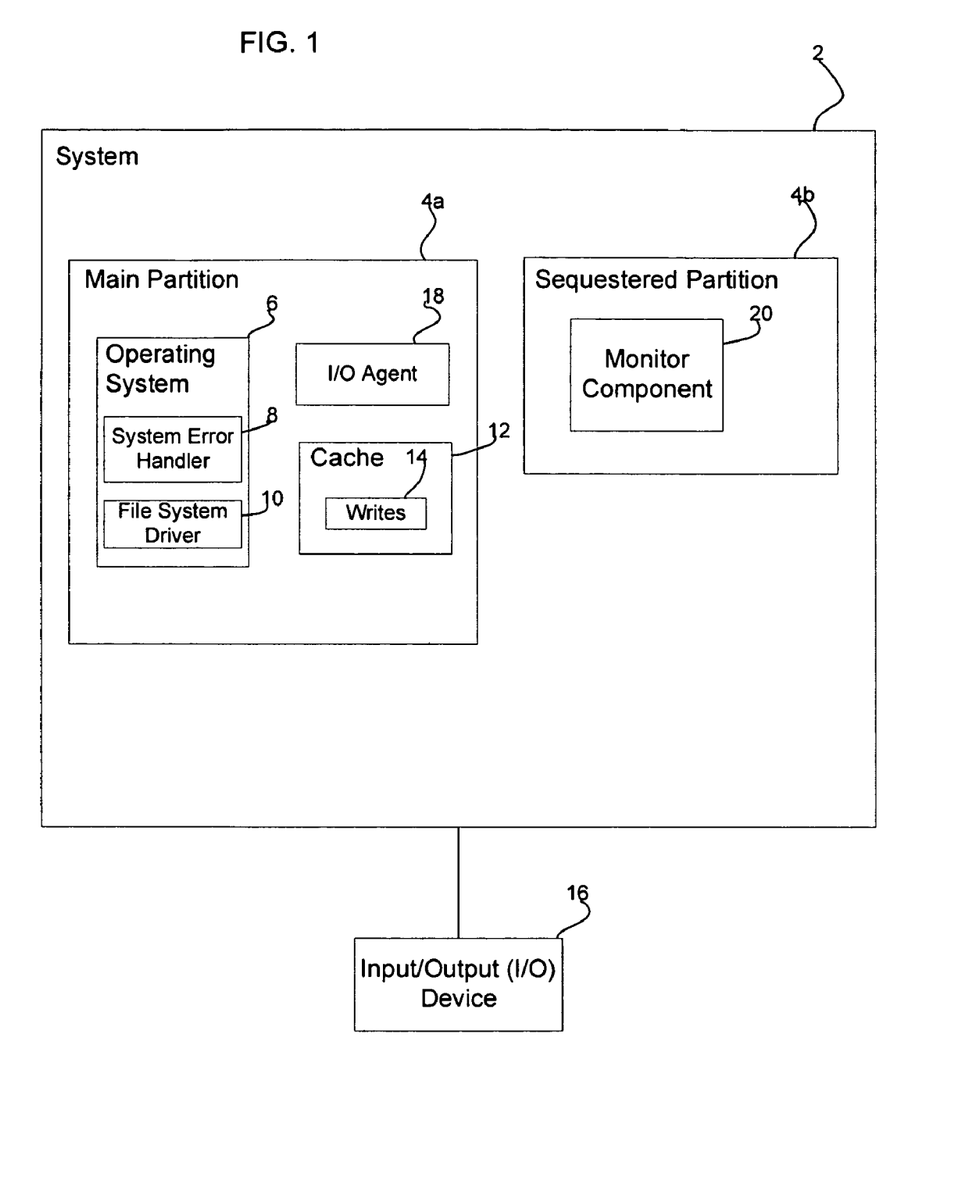
FIG. 1 illustrates an embodiment of a computer system.

FIG. 1 illustrates a computing environment used with the described embodiments. A system 2 includes a main partition 4a and an additional partition 4b, referred to as a sequestered partition 4b. Separate hardware resources are dedicated to each partition 4a, 4b, such that programs executing in one partition do not use resources dedicated to another partition. The main partition 4a includes an operating system 6, a system error handler 8 to manage error handling operations (e.g., critical errors, etc.), and a file system driver 10 to manage I/O requests and file related requests for the operating system 6. The system 2 includes a cache 12 implemented in a volatile memory device in which writes 14 are buffered before being transferred or committed to an I/O device 16, such as an attached storage device (e.g., a flash memory, hard disk drive, tape drive, optical storage, an array of disk drives (e.g., a redundant array of independent disks (RAID), etc), a printer, a network adaptor, etc. The I/O device 16 may be included within the system 2 box or may be an external device attached directly to the system 2 via a cable or-connected over a network.

The main, partition 4a further includes an I/O agent 18 that processes writes 14 being posted to the cache 12 and provides information on the writes to a monitor component 20 executing in the sequestered partition 4b. In one embodiment, the I/O agent 18 is implemented in firmware in hardware components in the system 2. Alternatively, the I/O agent 18 may comprise a program executing in the kernel space of the operating system 2 that receives writes from the file system driver 10.

In one embodiment, the different partitions 4a, 4b operate independently of one another, using separate hardware resources. The partitions 4a, 4b may be segregated electronically and each utilize separate dedicated hardware resources. Each partition provides a separate and independent execution environment. For instance, each partition 4a, 4b may include separately executing operating systems that concurrently execute programs independently of one another. Alternatively, the partitions 4a, 4b may comprise separate virtual machine partitions managed by a virtualization machine manager or virtualization layer that allows the partitions 4a, 4b to provide separate execution environments over the same system 2 hardware. Virtualization allows multiple virtual machines with heterogeneous operating systems to run in isolation, side-by-side, on the same physical machine. Each virtual machine has its own set of virtual hardware upon which an operating system and applications are loaded. The operating system sees a consistent, normalized set of virtual hardware independent of the actual physical hardware components. A virtual machine manager (also known as a virtualization layer, hypervisor, etc.) provides a layer of abstraction between computing, storage and network hardware resources. An example of a virtualization machine manager comprises the virtualization program VMware®. (VMWARE is a registered trademark of VMware, Inc.).

Figure 2:
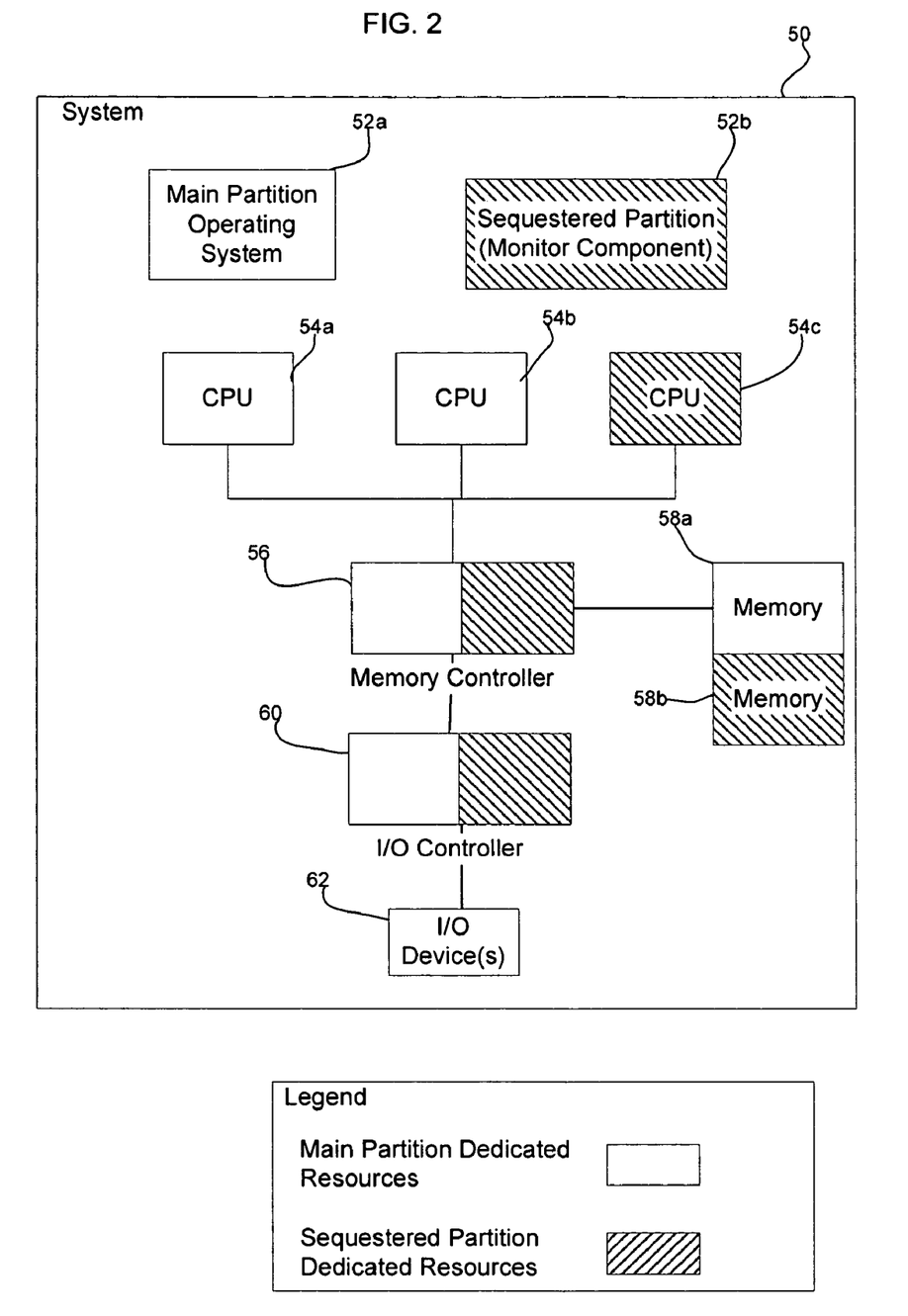
FIG. 2 illustrates an embodiment of hardware components in a computer system.

FIG. 2 illustrates an embodiment of the hardware resources of a system 50, such as system 2 (FIG. 1), in which a main partition 52a and sequestered partition 52b, such as partitions 4a, 4b (FIG. 1), may be implemented. The system 50 includes a plurality of central processing units 54a, 54b, 54c, a memory controller 56 managing access to an attached memory 58a, 58b, and an I/O controller 60 managing access to the attached one or more I/O devices 62. The CPUs 54a, 54b, 54c, memory controller 56 and I/O controller 60 may be part of a chipset. For instance, the memory controller 56 and I/O controller 60 may comprise the north bridge (e.g., memory controller hub (MCH)) and south bridge (e.g., I/O controller hub (ICH)), respectively, in certain chipset implementations. FIG. 2 illustrates hardware resources dedicated to the main partition 52a as without hatched lines, i.e., white, and hardware resources dedicated to the sequestered partition 52b as having hatched lines, as shown in the legend of FIG. 2.

In the embodiment of FIG. 2, all or part of the functionality of the I/O agent 18 (FIG. 1) may be implemented in firmware of the memory controller 56. In this way, the chipset including the memory controller 56 provides support for sequestered partition monitoring of the cache 12. Further, the cache 12 may be implemented in the memory 58a resources dedicated to the main partition 52a.

Figure 3:
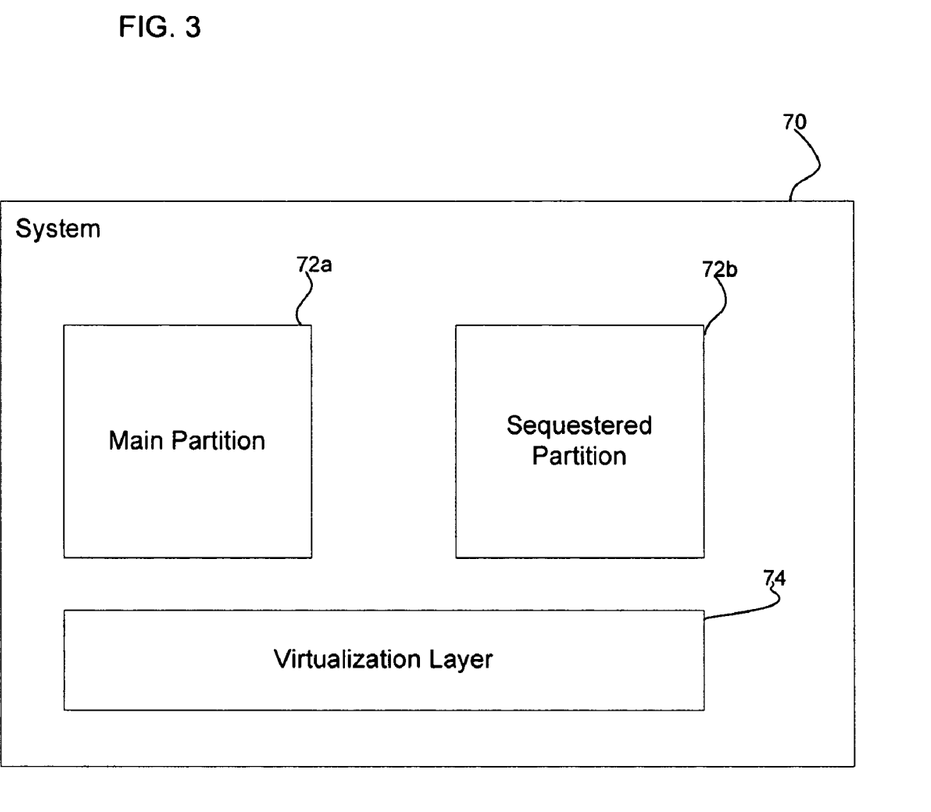
FIG. 3 illustrates an embodiment of a computer system having a virtualization layer.

FIG. 3 illustrates an alternative embodiment of a system 70 having two partitions 72a, 72b, which may include the components of partitions 4a, 4b (FIG. 1) and the hardware components shown in system 50 of FIG. 2. System 70 further includes a virtualization layer 74, such as a virtualization machine manager program, that manages the partitions 72a, 72b (i.e., execution environments) as separate virtual machines. In such a virtual machine embodiment, the I/O agent 18 (FIG. 1) comprises a program which may be implemented in a kernel of the operating system 6 to intercept writes from the file system driver 10 directed to the cache 12.

Figure 4:
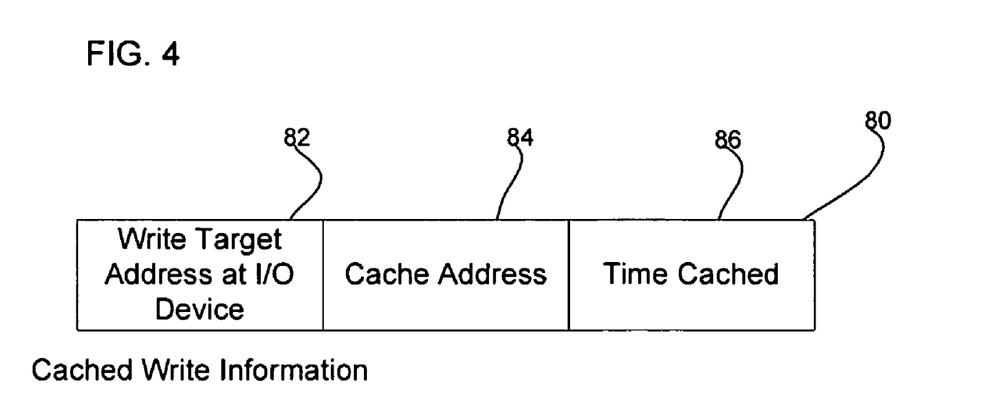
FIG. 4 illustrates an embodiment of information on a cached write.

FIG. 4 illustrates an embodiment of cached write information 80 the I/O agent 18 communicates to the monitor component 20. The information 80 includes information identifying the write, such as the write target address 82 at the I/O device 16, a cache address 84 of where the write is stored in the cache 12, and a time cached 86 the write was buffered in the cache 12.

Figure 5:
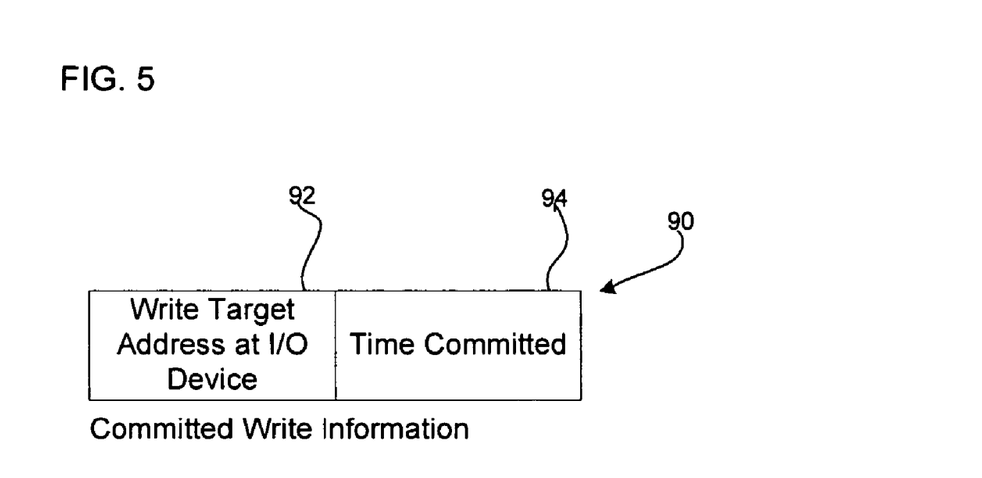
FIG. 5 illustrates an embodiment of information on a committed write.

FIG. 5 illustrates an embodiment of committed write information 90 of writes transferred, i.e., flushed or posted, from the cache 12 to the I/O device 16. The committed write information 90 includes information identifying the write, such as the write target address 92 at the I/O device 16 and a time or timestamp when the transfer to the I/O device 16 occurred.

Additional or different information may be included with the cached 80 or committed 90 write information to identify the writes. In an alternative embodiment, the cached write information 80 maintained by the monitor component 20 may also include a snapshot of the write data.

Figure 6:
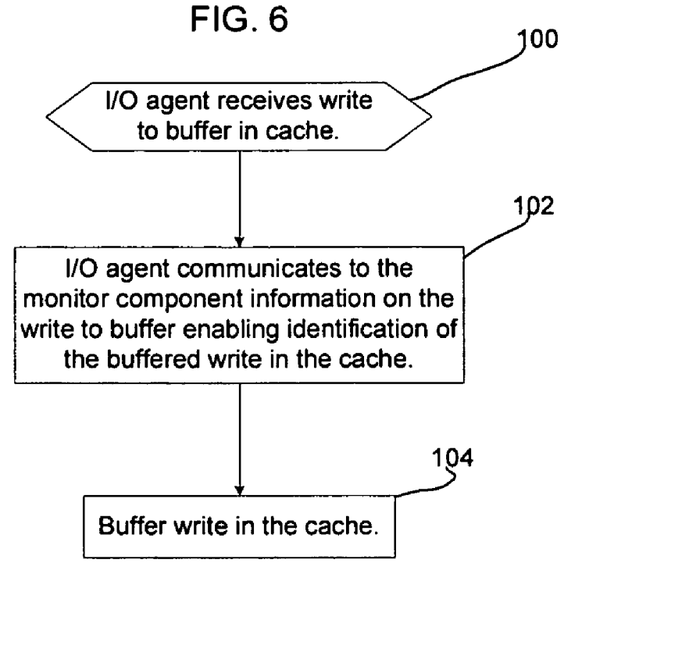
FIG. 6 illustrates an embodiment of operations performed when buffering write data in a cache.

FIG. 6 illustrates an embodiment of operations performed by the I/O agent 18 to communicate cached write information 80 to the monitor component 20. In response to receiving a write to buffer in cache 12 from the file system driver 10, the I/O agent 18 communicates to the monitor component 20 cached write information 80 on the write being buffered in cache 12 to enable identification of the buffered write in the cache 12. The cached write information 80 may include the information shown in FIG. 3. In one embodiment, the I/O agent 18 may write the information to communicate to the monitor component 20 in a memory region, e.g., 58b, accessed by the monitor component 20. The monitor component 20 periodically reads this memory region to access any messages or information from the I/O agent 18. Other inter-partition communication techniques may also be used to allow the I/O agent 18 to communicate with the monitor component 20 across the partitions 4a, 4b. The I/O agent then buffers (at block 106) the write in the cache 12.

Figure 7:
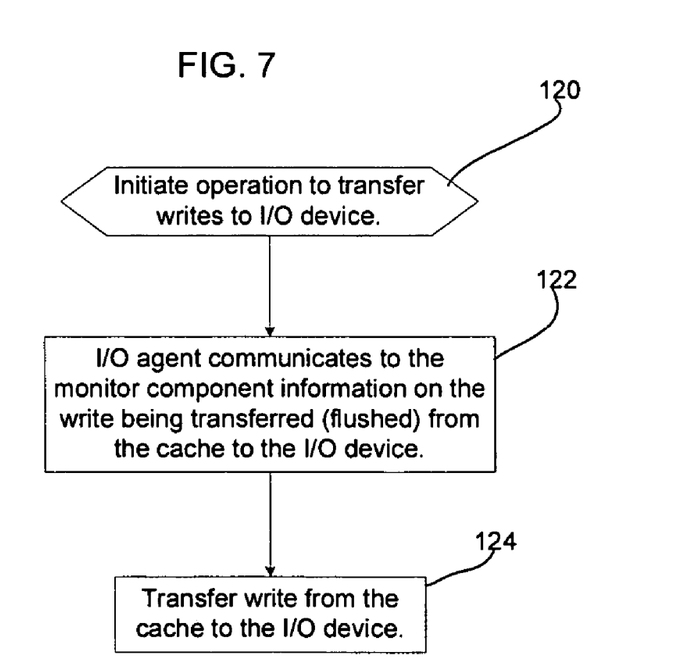
FIG. 7 illustrates an embodiment of operations performed when transferring writes from the cache to a target Input/Output (I/O) device.

FIG. 7. illustrates an embodiment of operations performed by the I/O agent 18 to communicate information on writes 14 transferred, e.g., flushed, from the cache 12 to the I/O device 16. In response to initiating (at block 120) an operation to flush writes from the cache 12, which the file system driver 10 or some other component may periodically initiate in the background, the I/O agent 18 communicates (at block 122) to the monitor component 20 information on the write being transferred (flushed) from the cache 12 to the I/O device 16. The I/O agent 18 may intercept writes being transferred from the cache 12 to the I/O device 16 to process and communicate the information. The writes 12 are then flushed (at block 124) to the I/O device 16.

Figure 8:
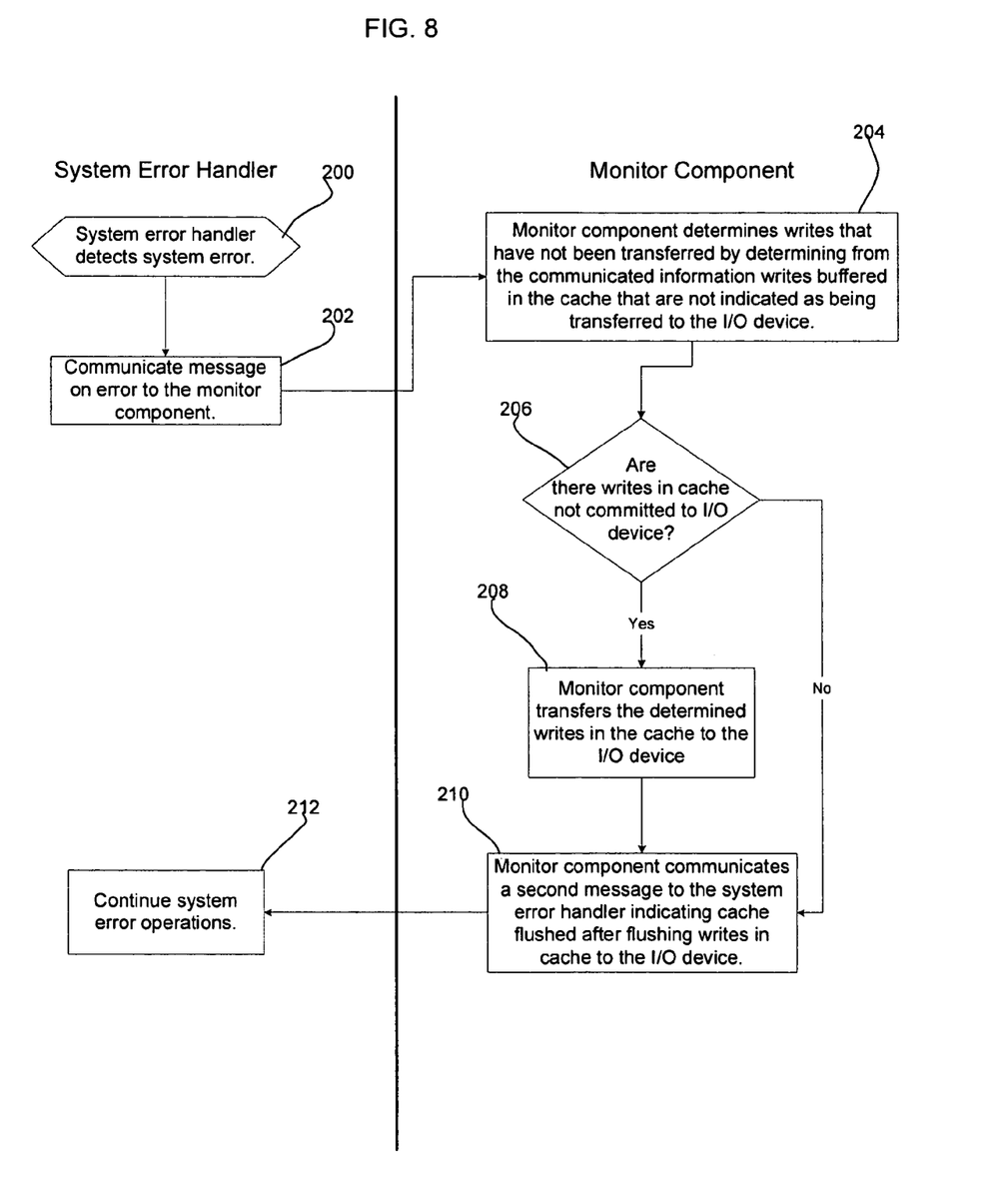
FIG. 8 illustrates an embodiment of operations to perform in the event of a system error.

FIG. 8 illustrates an embodiment of operations performed by the system error handler 8 and the monitor component 20 to coordinate the handling of system errors. Control begins (at block 200) when the system error handler 8 detects a system error, which may comprise a critical error that will result in a system freeze or restart. Upon detecting the error, the system error handler 8 communicates (at block 202) a message on the error to the monitor component 20. In response, the monitor component 20 determines (at block 204) writes 14 in the cache 12 (FIG. 1) that have not been transferred to the I/O device 16. In one embodiment, the uncommitted writes 14 in cache 12 may be determined from the communicated information on writes buffered in the cache that are not indicated as being transferred to the I/O device. A write 14 that is not indicated as committed may comprise a write identified by cached write information 80 that does not have corresponding committed write information 90 indicating that the write has been flushed. Periodically, the monitor component 20 may delete information 80, 90 for cached writes 14 that have been transferred to the I/O device 16. If (at block 206) there are writes 14 in the cache 12 not committed to the I/O device 16, then the monitor component 20 causes the transfer (at block 208) of the determined uncommitted writes 14 from the cache 12 to the I/O device 16. In an alternative embodiment where the monitor component 20 stores a snapshot of writes 14 in the cache 12, the monitor component 20 may directly write the snapshots of the determined uncommitted writes 12 to the I/O device 16. The monitor component 20 may further invalidate or remove any writes 12 flushed from cache to the I/O device 16. After flushing the writes 12 to the I/O device (at block 208) or if there are no determined uncommitted writes in the cache 12 (from the no branch of block 206), then the monitor component 20 communicates (at block 210) a second message to the system error handler 8 in the first partition 4a indicating that uncommitted writes 14 were flushed to the I/O device 16. In response, the system error handler 8 continues system error operations (e.g., reset system, etc).

Described embodiments provide techniques to enable one partition to monitor certain components in another partition so that in the event of a system failure in the monitored partition, the partition performing the monitoring may take certain actions before the system failure routine, e.g., a restart, occurs. For instance, a monitor component in one partition may monitor uncommitted writes to a cache. In the event of a system failure, the partition being monitored, e.g., the main partition 4a, may transfer control to the monitor component to flush the uncommitted data to cache before the system restarts.

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In FIGS. 1 and 3, the monitor component 20 and I/O agent 18 are shown as included in separate partitions. In an alternative embodiment, these components may be included in a same partition, i.e., execution environment.

The terms "an embodiment", "embodiment",. "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

A character used to represent a variable number of an element, e.g., 54c, 58b, 52b, 4b, may indicate any number of instances of the element, and may indicate different integer numbers when used with different elements or with the same element in different instances.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or that a different number of devices may be used than the multiple number shown.

The functionality and/or the features of a device may be alternatively embodied by one or more other devices which are not explicitly described as having such functionality/features. Thus, other embodiments of the present invention need not include the device itself.

The illustrated operations of FIGS. 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture implementing code, including a monitor component, wherein the code causes operations to be performed, the operations comprising:
   buffering writes to an Input/Output (I/O) device in a cache;
   communicating information on the buffered writes enabling identification of the buffered writes in the cache to the monitor component;
   detecting a system failure;
   determining, by the monitor component, from the information the writes buffered in the cache that have not been transferred to the I/O device in response to the system failure; and
   causing the transfer, by the monitor component, of the determined writes to the I/O device.

2. The article of manufacture of claim 1, wherein the operations further comprise:
   enabling system error handling in response to transferring the determined writes in the cache to the I/O device.

3. The article of manufacture of claim 1, wherein the operations further comprise:
   communicating to the monitor component information on writes transferred to the I/O device, wherein the monitor component determines writes that have not been transferred by determining from the communicated information writes buffered in the cache that are not indicated as being transferred to the I/O device.

4. The article of manufacture of claim 1, wherein memory controller hardware managing access to the cache communicates information on the buffered writes to the monitor component.

5. The article of manufacture of claim 1, wherein a program executing in an operating system kernel intercepts writes being buffered in the cache and communicates the information on the buffered writes to the monitor component.

6. The article of manufacture of claim 1, wherein the writes to the I/O device and buffering of the writes are managed by an operating system executing in a first partition and wherein the monitor component executes in a second partition, wherein the first and second partitions provide separate execution environments.

7. The article of manufacture of claim 6, wherein hardware resources are dedicated to the first and second partitions, wherein programs executing in one partition would not utilize the hardware resources dedicated to the other partition, and wherein the monitor component uses hardware resources dedicated to the second partition to transfer buffered writes in the cache to the I/O device.

8. The article of manufacture of claim 6, wherein the operating system detects the system failure, wherein the operating system communicates information on the buffered writes to the monitor component, further comprising:
   communicating, by the operating system, a message to the monitor component indicating the detected system failure, wherein the monitoring component determines writes buffered in the cache that have not been transferred to the I/O device and transfers the determined writes to the I/O device in response to the message.

9. The article of manufacture of claim 8, wherein the message comprises a first message, wherein the operations further comprise:
communicating, by the monitor component, a second message to the operating system in response to causing the transfer of the determined writes from the cache to the I/O device; and
continuing system error handling operations, by the operating system, in response to the second message.

10. The article of manufacture of claim 6, wherein the first and second partitions are implemented as separate virtual machines by virtualization software.

11. The article of manufacture of claim 1, wherein transferring the writes to the I/O device comprises the monitor component causing the writes in the cache to be transferred to the I/O device.

12. The article of manufacture of claim 1, wherein the operations further comprise:
communicating to the monitor component an image of writes buffered in the cache, wherein transferring the writes to the I/O device comprises the monitor component writing the images of the writes to the I/O device.

13. A system in communication with an Input/Output (I/O) device, comprising:
a cache;
a monitor component;
a file system driver buffering writes to an Input/Output (I/O) device in the cache;
an I/O agent communicating information on the buffered writes enabling identification of the buffered writes in the cache to the monitor component;
a system error handler detecting a system failure;
wherein the monitor component is enabled to perform:
determining from the information the writes buffered in the cache that have not been transferred to the I/O device in response to the system failure; and
causing the transfer of the determined writes to the I/O device.

14. The system of claim 13, wherein the I/O agent is further enabled to perform:
communicating to the monitor component information on writes transferred to the I/O device, wherein the monitor component determines writes that have not been transferred by determining from the communicated information writes buffered in the cache that are not indicated as being transferred to the I/O device.

15. The system of claim 13, wherein the I/O agent is implemented in memory controller hardware managing access to the cache.

16. The system of claim 13, wherein the I/O agent comprises a program executing in an operating system kernel.

17. The system of claim 13, further comprising:
a first partition in which an operating system, the I/O agent, the system error handler, and the file system driver execute; and
a second partition in which the monitor component executes, wherein the first and second partitions provide separate execution environments.

18. The system of claim 17, wherein hardware resources are dedicated to the first and second partitions, wherein programs executing in one partition would not utilize the hardware resources dedicated to the other partition, and wherein the monitor component uses hardware resources dedicated to the second partition to transfer buffered writes in the cache to the I/O device.

19. The system of claim 16, wherein the system error handler is further enabled to communicate a message to the monitor component indicating the detected system failure, wherein the monitoring component determines writes buffered in the cache that have not been transferred to the I/O device and transfers the determined writes to the I/O device in response to the message.

20. The system of claim 19, wherein the message comprises a first message, wherein the monitor component is further enabled to communicate a second message to the system error handler in response to causing the transfer of the determined writes from the cache to the I/O device; and wherein the system error handler continues system error handling operations in response to the second message.

21. The system of claim 17, wherein the first and second partitions are implemented as separate virtual machines by virtualization software.

22. The system of claim 13, wherein the I/O agent is further enabled to communicate to the monitor component an image of writes buffered in the cache, wherein the monitor component transfers the writes to the I/O device by writing the images of the writes to the I/O device.

23. A method, comprising:
buffering writes to an Input/Output (I/O) device in a cache;
communicating information on the buffered writes enabling identification of the buffered writes in the cache to a monitor component;
detecting a system failure;
determining, by the monitor component, from the information the writes buffered in the cache that have not been transferred to the I/O device in response to the system failure; and
causing the transfer, by the monitor component, of the determined writes to the I/O device.

24. The method of claim 23, further comprising:
communicating to the monitor component information on writes transferred to the I/O device, wherein the monitor component determines writes that have not been transferred by determining from the communicated information writes buffered in the cache that are not indicated as being transferred to the I/O device.

25. The method of claim 23, wherein the writes to the I/O device and buffering of the writes are managed by an operating system executing in a first partition and wherein the monitor component executes in a second partition, wherein the first and second partitions provide separate execution environments.

26. The method of claim 25, wherein the operating system detects the system failure, wherein the operating system communicates information on the buffered writes to the monitor component, further comprising:
communicating, by the operating system, a message to the monitor component indicating the detected system failure, wherein the monitoring component determines writes buffered in the cache that have not been transferred to the I/O device and transfers the determined writes to the I/O device in response to the message.

27. The method of claim 26, wherein the message comprises a first message, further comprising:
communicating, by the monitor component, a second message to the operating system in response to causing the transfer of the determined writes from the cache to the I/O device; and
continuing system error handling operations, by the operating system, in response to the second message.

28. The method of claim 23, further comprising:
communicating to the monitor component an image of writes buffered in the cache, wherein transferring the writes to the I/O device comprises the monitor component writing the images of the writes to the I/O device.

* * * * *